(12) United States Patent
Bune (10) Patent No.: US 7,751,489 B2
(45) Date of Patent: *Jul. 6, 2010

(54) DIGITAL GENERATOR AND DIGITAL RECEIVER FOR FDM SIGNALS

(75) Inventor: Paul A. M. Bune, Kornwestheim (DE)

(73) Assignee: Alcatel Lucent, Paris (FR)

( * ) Notice: Subject to any disclaimer, the term of this patent is extended or adjusted under 35 U.S.C. 154(b) by 788 days.

This patent is subject to a terminal disclaimer.

(21) Appl. No.: 11/565,907

(22) Filed: Dec. 1, 2006

(65) Prior Publication Data

US 2007/0127583 A1 Jun. 7, 2007

(30) Foreign Application Priority Data

Dec. 2, 2005 (EP) ................................. 05292575

(51) Int. Cl.
*H04L 27/00* (2006.01)
(52) U.S. Cl. ........................ 375/260; 375/316
(58) Field of Classification Search ......... 375/259–260; 370/203–210
See application file for complete search history.

(56) References Cited

U.S. PATENT DOCUMENTS

| 5,694,389 | A  | * | 12/1997 | Seki et al. ................. 370/208 |
| 6,647,066 | B1 |   | 11/2003 | Szajnowski |
| 6,985,432 | B1 | * | 1/2006  | Hadad ........................ 370/203 |
| 2002/0003774 | A1 |   | 1/2002 | Wang et al. |
| 2003/0048809 | A1 | * | 3/2003 | Van Doninck et al. ...... 370/503 |
| 2003/0128656 | A1 |   | 7/2003 | Scarpa |
| 2003/0179776 | A1 |   | 9/2003 | Sumasu et al. |
| 2004/0128605 | A1 | * | 7/2004 | Sibecas et al. ............... 714/746 |
| 2005/0008089 | A1 | * | 1/2005 | Bothe et al. .................. 375/261 |
| 2005/0013238 | A1 |   | 1/2005 | Hansen |
| 2005/0190826 | A1 | * | 9/2005 | Van Bruyssel et al. ...... 375/222 |
| 2007/0211827 | A1 | * | 9/2007 | Baggen et al. ............... 375/316 |

OTHER PUBLICATIONS

Wei Zhang et al, "On pilot pattern design for PSAM-OFDM system", Circuits and Systems, 2004. ISCAS '04, Proceedings of the 2004 International Symposium on Vancouver, BC, Canada, May 23-26, 2004, Piscataway, NJ, USA, IEEE, US, vol. 5, May 23, 2004, pp. 417-420, XP010719552.

* cited by examiner

*Primary Examiner*—Emmanuel Bayard
(74) *Attorney, Agent, or Firm*—Fay Sharpe LLP (57) ABSTRACT

An aspect of the invention relates to a digital generator for multi-carrier frequency division multiplexing (FDM) signals. The digital generator comprises an electronic circuit being operated under the control of a computer program. The digital generator is configured to generate FDM signals being comprised of FDM symbols, wherein at least one FDM symbol has pilot symbols which are non-equidistantly spaced in frequency. Another aspect of the invention relates to a digital receiver for multi-carrier FDM signals. The digital receiver comprises an electronic circuit being operated under the control of a computer program, and further comprises a demodulator for demodulating digital multi-carrier FDM signals, said signals being comprised of FDM symbols having pilot symbols, the pilot symbols of at least one FDM symbol being non-equidistantly spaced in frequency. Furthermore, it comprises a signal modification unit, said unit being configured to replace, on a sub-carrier basis, at least one data symbol with a pilot symbol, whereby the replacement yields a spacing of pilot symbols which is equidistant in frequency for all FDM symbols.

9 Claims, 6 Drawing Sheets

DIGITAL GENERATOR AND DIGITAL RECEIVER FOR FDM SIGNALS

The invention is based on a priority document EP 05 292,575.7 which is hereby incorporated by reference.

BACKGROUND OF THE INVENTION

Telecommunication systems using multi-carrier transmission are well known. They use a multitude of electromagnetic carrier waves, also called sub-carriers, to transmit information. Examples are digital subscriber line (DSL) modems or systems operating according to the digital audio broadcasting standard (DAB). In these examples the transmission is based on orthogonal frequency division multiplexing (OFDM).

Recently it has been discussed to use multi-carrier telecommunication systems for cellular mobile radio communication. As in all cellular telecommunication systems this brings the focus to the problem of interference. Since in a cellular system resources like frequencies or codes are reused in some distance, signal reception may be distorted by interference.

SUMMARY OF THE INVENTION

Taking this related art into account an object of embodiments of the invention is to provide a digital generator and a digital receiver for multi-carrier frequency division multiplexing (FDM) signals, whereby these signals have a degree of freedom which can be reused in some distance in a cellular telecommunication system.

This object is solved by the features of the independent claims. Further embodiments of the claimed invention are described by the features of the sub-claims.

A first aspect of the invention relates to a digital generator for multi-carrier frequency division multiplexing (FDM) signals. The digital generator comprises an electronic circuit being operated under the control of a computer program. The electronic circuit is adapted to generate digital FDM signals being comprised of FDM symbols, wherein at least one FDM symbol has pilot symbols which are non-equidistantly spaced in frequency.

Within this description a sub-carrier shall be understood to be an electromagnetic wave having a frequency within a certain frequency band. Each sub-carrier is used to transmit information to a user in units called symbols. The sub-carriers have different frequencies and the telecommunication system is a frequency division multiplexing (FDM) system, e.g. an OFDM system. The symbols which relate to user information, e.g. user data such as text data or speech data, are called data symbols. Further information needed by the system for a proper transmission of information is contained in pilot symbols, often abbreviated "pilots". Pilot symbols are used by multi-carrier systems for carrying out a channel estimation, a process which determines the channel transfer function of the wanted signal. With the help of the channel transfer function the transmitted information can be derived from the received signal.

The arrangement or pattern of pilot symbols and data symbols within a multi-carrier signal is governed by a time frequency map, herein abbreviated TF map. A TF map defines the position of data symbols and pilot symbols in time and frequency. The frequency is the frequency of the sub-carriers which in many cases determined by a norm or industry standard. The transmission time is subdivided in time slots of fixed length, e.g. 2 ms in the case of OFDM. A time slot, also called TTI (transmission time interval) in the case of OFDM, is used to transmit data symbols as well as pilot symbols. A non-equidistant spacing in frequency then means that the associated FDM symbol, e.g. OFDM symbol, has a variable number of data symbols between two (neighbouring) pilot symbols. Likewise, there is a variable number of sub-carriers between the two sub-carriers which carry pilot symbols.

The digital generator of said first aspect of the invention provides multi-carrier signals having a selectable pilot pattern. The pilot pattern actually chosen for transmission purposes depends on the requirements of the multi-carrier telecommunication system. The digital generator may enable the provision of different pilot patterns for different cells of such a system. This degree of freedom can be used to distinguish signals with the help of their pilot patterns.

The pilot pattern represents a degree of freedom which can be reused by the cellular telecommunication system in some distance. As a general rule two cells of a cellular telecommunication system can use the same pilot pattern when they are too remote from each other such that signals originating from these two cells show a negligible interference only.

Another embodiment suggests that all FDM symbols show a non-equidistant spacing of their pilot symbols. It is also possible that all FDM symbols show the same non-equidistant spacing of their pilot symbols.

If desired, the FDM system may be an OFDM system, such that the digital generator is configured to output OFDM signals. This facilitates the use of OFDM for cellular mobile radio communication.

In a further embodiment the electronic circuit is a digital signal processor (DSP) or a field programmable gate array (FPGA). This allows flexible modifications of the computer program associated with the DSP or FPGA. However, the man skilled in the art will easily derive that other hardware solutions can be used as well. In this respect pure hardware solutions can be chosen, e.g. an application-specific integrated circuit (ASIC), where the computer program is represented by the logic of the hardware. In this respect the term "computer program" should be understood to include the logic of an electronic circuit such as an ASIC. Furthermore, any other microprocessor being operated by a computer program can be used.

The generated multi-carrier signal is a digital signal. A further embodiment provides a digital-to-analogue (D/A) converter connected to an output port of the electronic circuit, and an antenna connected to the output port of the D/A converter. The antenna is then used to transmit the analogue signal over the air interface.

Other aspects of the invention relate to the devices which have such a digital generator as described above. On the one hand a base station or an access point of a wireless cellular telecommunication system may have such a digital generator. On the other hand, terminal devices being serviced by such base stations or access points may have such a generator. The terminal device may be a mobile terminal device such as a mobile phone, a laptop, a notebook, a portable digital assistant (PDA) or any other suitable electronic device which can be serviced by a base station or access point in a wireless fashion by FDM signals, in particular OFDM signals.

Another aspect of the invention relates to a digital receiver for multi-carrier FDM signals. The digital receiver comprises an electronic circuit being operated under the control of a computer program. It further comprises a demodulator for demodulating digital multi-carrier FDM signals, the demodulator being adapted to demodulate signals being comprised of FDM symbols having pilot symbols, the pilot symbols of at least one FDM symbol being non-equidistantly spaced in frequency. Furthermore, the digital receiver has a signal modification unit, said unit being adapted to replace, on a sub-carrier basis, at least one data symbol with a pilot symbol, whereby the replacement yields a spacing of pilot symbols which is equidistant in frequency for all FDM symbols.

The digital receiver described above receives and demodulates signals having a first pattern of pilot symbols. The signal modification unit modifies the pilot pattern of the demodulated signals by a replacement process and thus yields multi-carrier signals having a second pilot pattern. The replacement yields a spacing of pilot symbols which is equidistant in frequency for all FDM symbols.

The second pilot pattern is chosen to be suitable for the computer software of hardware which is used to carry out a further processing of the signals, in particular channel estimation and data demodulation. For example, the second pilot pattern allows using a FFT (fast fourier transformation) channel estimation to derive the channel impulse response of the multi-carrier signals. A direct channel estimation of signals with the first pilot pattern, i.e. of signals with a variable spacing of pilot symbols within FDM symbols, cannot be done with a FFT channel estimator, as this type of channel estimator puts rigid requirements on the pilot patterns. In particular, a FFT channel estimator requires fixed distances between the pilot symbols on a sub-carrier.

In another embodiment the multi-carrier signals which are processed as discussed above are OFDM signals. This embodiment facilitates the reception and processing of OFDM signals with different pilot patterns, whereby the pilot pattern can be chosen to identify the origin of the signal source and to distinguish these signals with the help of their pilot patterns. As an example, the cellular telecommunication system may have individual pilot patterns for their cells, whereby a pilot pattern can be reused in some distance.

The replacement mentioned above can be carried out by the signal modification unit in at least two ways. One possibility is copying a pilot symbol into a data symbol. Another possibility is to carry out an interpolation, e.g. a linear interpolation.

In a further embodiment the signal modification unit is adapted to provide a DC sub-carrier with pilot symbols by means of interpolation, e.g. linear interpolation. The DC sub-carrier is, per definition, not usable for transmitting information or pilot symbols, but it can be used when processing the received multi-carrier FDM signals, e.g. OFDM signals. The interpolation may use two pilot symbols of the same or adjacent FDM symbols to generate a new pilot symbol in an OFDM symbol. This interpolation is more accurate when the frequency of these two pilot symbols are close to the frequency of the DC sub-carrier.

Generating pilot symbols on the DC sub-carrier increases the number of available pilot symbols and improves the accuracy of the channel estimation. This pilot symbol generation is carried out internal to the receiver portion of the corresponding device receiving the multi-carrier signals. These additional pilot symbols can thus be regarded to be virtual pilot symbols in contrast to real (i.e. actually transmitted) pilot symbols.

In another embodiment the digital receiver further comprises a channel estimator, e.g. a FFT channel estimator, and comprises a demodulation unit for sub-carriers of the FDM signals. The demodulation unit performs a single carrier demodulation which might be a QAM or QPSK demodulation. With the channel estimator and the demodulation unit the information contained in the FDM signals can be retrieved.

The electronic circuit being part of the electronic receiver may in another embodiment be a digital signal processor (DSP) or a field programmable gate array (FPGA). This allows flexible modifications of the computer program associated with the DSP or FPGA for processing the received FDM signals. However, the man skilled in the art will easily derive that other hardware solutions can be used as well. In this respect pure hardware solutions can be chosen, e.g. an ASIC, where the computer program is represented by the logic of the hardware. Furthermore, any other microprocessor being operated under the control of a computer program can be used.

Other aspects of the invention relate to the devices which have such a digital receiver as described above. On the one hand a base station or an access point of a wireless cellular telecommunication system may have such a digital receiver. On the other hand, terminal devices being serviced by such base stations or access points may have such a generator. The terminal device may be a mobile terminal device such as a mobile phone, a laptop, a notebook, a portable digital assistant (PDA) or any other suitable electronic device which can be serviced by a base station or access point in a wireless fashion by FDM signals, in particular OFDM signals.

These and other aspects of the claimed invention will be apparent from and elucidated with reference to the embodiments described thereafter. It should be noted that the use of reference signs shall not be construed as limiting the scope of the invention.

DETAILED DESCRIPTION OF THE INVENTION

Figure 1:
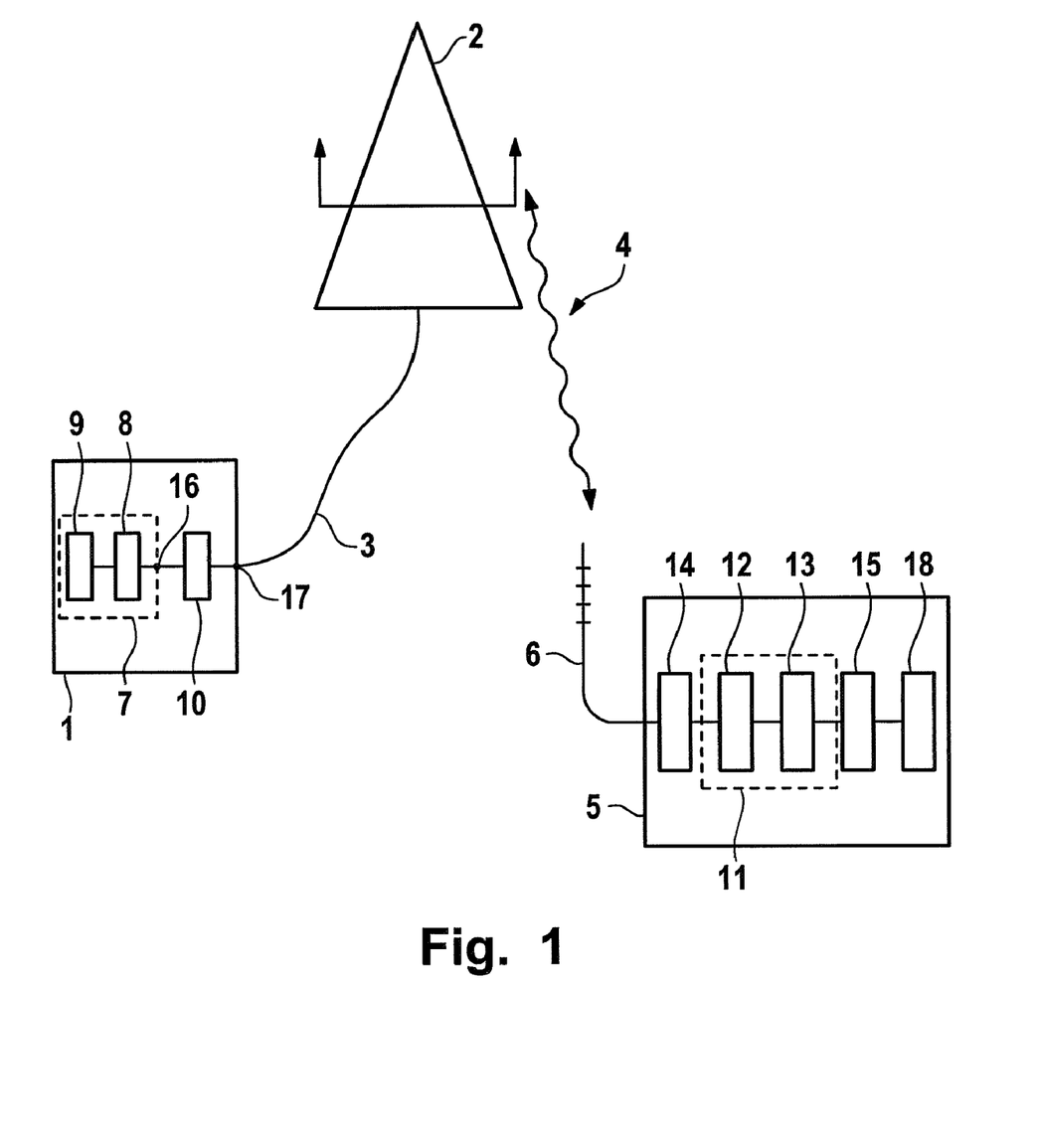
FIG. 1 shows a base station and a terminal device of a cellular telecommunication system.

FIG. 1 shows a base station 1 being connected to an antenna 2 by a cable 3. The base station 1 exchanges OFDM signals 4 with a terminal device 5 having an antenna 6. The base station services a multitude of users in a cellular telecommunication network (not shown).

Base station 1 has a digital generator 7 for OFDM signals 4. The digital generator 7 comprises an electronic circuit 8 and a random access memory (RAM) 9. The electronic circuit 8 may be a DSP, an FPGA or any type of microprocessor using the RAM 9 for running a computer program. A D/A converter 10 is used to generate an analogue signal which can be transmitted over the air by the help of antenna 2.

Terminal device 5 receives the transmitted OFDM signal 4 with the help of its antenna 6. Terminal device 5 has a digital receiver 11 which comprises a multi-carrier demodulator 12 and a signal modification unit 13. Digital receiver 11 gets digital signals from A/D converter 14 converting the analogue OFDM signals 4 detected by antenna 6. As will be described below in more detail, the multi-carrier demodulator 12 demodulates a signal having a non-equidistant spacing of pilot symbols within at least one OFDM symbol. The OFDM signals with this first pilot pattern is modified by the signal modification unit 13. The signal modification unit 13 modifies the pilot pattern and generates OFDM signals with an equidistant spacing of pilot symbols within all OFDM symbols.

As a matter of fact a base station 1 in a wireless cellular telecommunication network may not only be adapted to generate OFDM signals 4 by means of a digital generator 7, but may also adapted to receive such signals by a digital receiver 11. The same applies mutatis mutandis for the terminal device 5, such that FIG. 1 is a simplified figure which only illustrates the flow of signals from base station 1 to terminal device 5.

Figure 2:
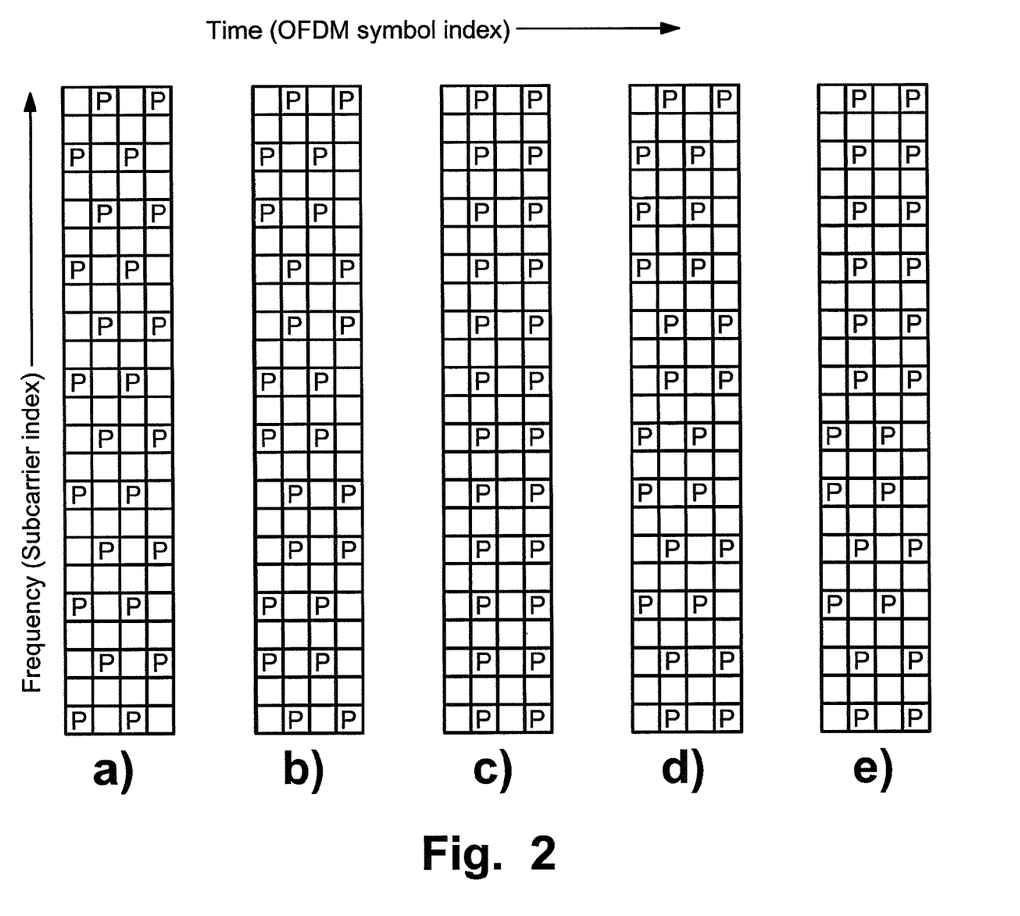
FIG. 2 shows examples of simplified TF maps with different pilot patterns for the transmission of OFDM signals by a digital generator.

FIG. 2 shows simplified TF maps 2a) . . . . 2e) with different pilot patterns for the transmission of OFDM signals by a digital generator 7. In each TF map the time is plotted in units of TTIs along the horizontal axis, and the sub-carrier index, representing the sub-carrier frequency, is plotted along the vertical axis. For simplicity the horizontal axis is subdivided into four TTIs only, and the vertical axis is subdivided in only 23 frequency indexes. Each TF map thus contains only four OFDM symbols. The man skilled in the art will easily derive that this TF map is a simplified TF map, as an OFDM TF map contains more sub-carriers. The simplification is chosen for an easier understanding of the embodiments.

FIG. 2a) is a TF map with a pilot pattern suitable for FFT channel estimation within an OFDM receiver. Each OFDM symbol contains six pilot symbols denoted by "P". All other boxes in this TF map are filled by data symbols. The pilot symbols of each OFDM symbol are equidistantly spaced in frequency. Correspondingly, there is always the same number of data symbols between two neighbouring pilot symbols. In the case of FIG. 1a) there are always three data symbols (blank boxes) between two pilot symbols. This is also the case for the bottom part of the second and the fourth OFDM symbol, as the TF map is truncated at the bottom for the above-mentioned reason of simplicity.

FIG. 2b) . . . 2e) are TF maps with pilot patterns in which the pilot symbols are non-equidistantly spaced in frequency. These are only a few examples of the many variants which exist. The man skilled in the art will easily derive that there are many other possible pilot patterns with pilot symbols being non-equidistantly spaced in frequency.

In FIG. 2b) the first OFDM symbols contains 6 pilot symbols, whereby there are either 1 or 5 data symbols between two pilot symbols. The same is true for the other three OFDM symbols.

FIG. 2c) has an equidistant spacing of pilot symbols in the second and fourth OFDM symbol, but has no pilot symbols in the first and third OFDM signal.

FIG. 2d) has, for each OFDM symbol, 6 pilot symbols with 1, 3 or 5 data symbols between two (neighbouring) pilot symbols. Each OFDM symbol has the same pattern of pilot symbols, but with a frequency offset.

FIG. 2e) has either 1, 3 or 5 data symbols between two pilot symbols associated with an OFDM symbol. Again, each OFDM symbol has the same pattern of pilot symbols, but with a frequency offset. In the lower part the TF map of FIG. 2e) is identical to the TF map of FIG. 2d), but there are differences in the upper part.

A digital generator 7, e.g. a base station 1, transmits FDM signals, e.g. OFDM signals 4, with pilot patterns according to FIG. 2b), 2c) 2d) or 2e) or any other pilot pattern in which the pilot symbols "P" are non-equidistantly spaced in frequency for at least one FDM symbol. In practical terms the individual sub-carriers are modulated first. This step is called single carrier modulation. Then an encoder generates data symbols, e.g. QAM symbols if QAM modulation is chosen, or QPSK modulation, if QPSK modulation is chosen. Then the FDM symbols are generated on the basis of a TF map, e.g. the TF map according to any of the TF, maps of FIG. 2b) to FIG. 2e), whereby pilot symbols are inserted. Finally, the signals which comprise the FDM symbols is modulated. The last step is called multi-carrier modulation.

The result is a digital multi-carrier signal. These digital multi-carrier signals are converted into an analogue signals by means of an digital-to-analogue converter 10. Base station 1 uses its antenna 2 to transmit the analogue signal over the air. Another device, e.g. a terminal device 5, has an electronic digital receiver 11, receives OFDM signal 4 with the help of antenna 6, and converts the analogue signal into a digital signal by means of an analogue-to-digital converter 14. The digital multi-carrier signal it has received has a first pilot pattern. The first pilot pattern is characterized by a non-equidistant spacing of pilot symbols in at least one FDM symbol. The pilot pattern might be a pilot pattern according to FIG. 2b) . . . FIG. 2e).

The digital receiver 11 then processes the signals having the first pilot pattern. This processing comprises replacing, on a sub-carrier basis, at least one data symbol with a pilot symbol. In this way the replacement yields a second pilot pattern with a spacing of pilot symbols which is equidistant in frequency for all FDM symbols. The second pilot pattern may be the pilot pattern shown in FIG. 2a).

The multi-carrier signals having the second pilot pattern can then be used to carry out a channel estimation with a channel estimator 15, e.g. a FFT channel estimator, and to carry out a single carrier demodulation to derive the information carried by the signal.

In practical cases the digital receiver 11 receives signals of different signal sources within the cellular telecommunication system. Each cell may be associated with an individual pilot pattern, which, according to the embodiments described above, are transferred into a second pilot pattern with an equidistant spacing of pilot symbols in the FDM symbols. The above devices provide a large multitude of pilot patterns which can be used for that purpose.

Figure 3:
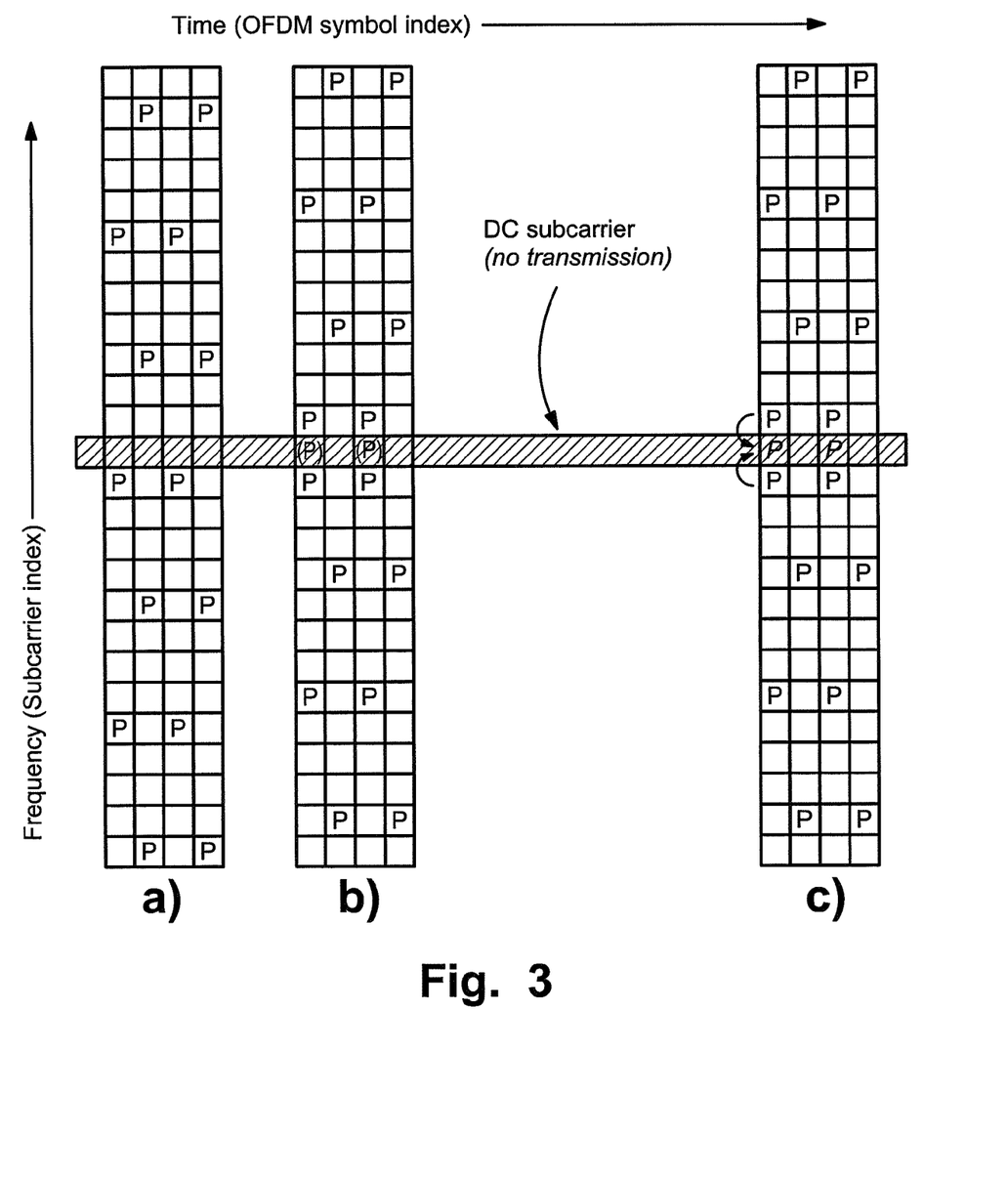
FIG. 3 shows the creation of virtual pilot symbols on the DC sub-carrier within a digital receiver of OFDM signals, FIG. 4 the creation of a new pilot pattern within a digital OFDM receiver.

FIG. 3a-c show that the above embodiments may use pilot patterns with virtual, i.e. non-transmitted, pilot symbols on a DC sub-carrier. In FIG. 3a) there are pilot symbols around the DC sub-carrier which are equidistantly spaced in frequency.

FIG. 3b) shows the same pilot symbol pattern as in FIG. 2a), but shifted upwards by one sub-carrier. To maintain equidistant spacing between the pilot symbols, pilots should be placed on the DC sub-carrier as indicated by "(P)". However, it is not possible to transmit pilot symbols "(P)" as the DC sub-carrier shall not be used for transmission. Instead, pilot symbols on the DC sub-carrier are derived by interpolation, e.g. linear interpolation, from additional pilot symbols above and below the DC sub-carrier. The way in which this is done is shown in FIG. 3c). In FIG. 3c) two pilot symbols are used for interpolating one pilot symbol on the DC sub-carrier. The TF maps 3a) to 3c) are exemplary and simplified TF maps for sake of clarity.

Figure 4:
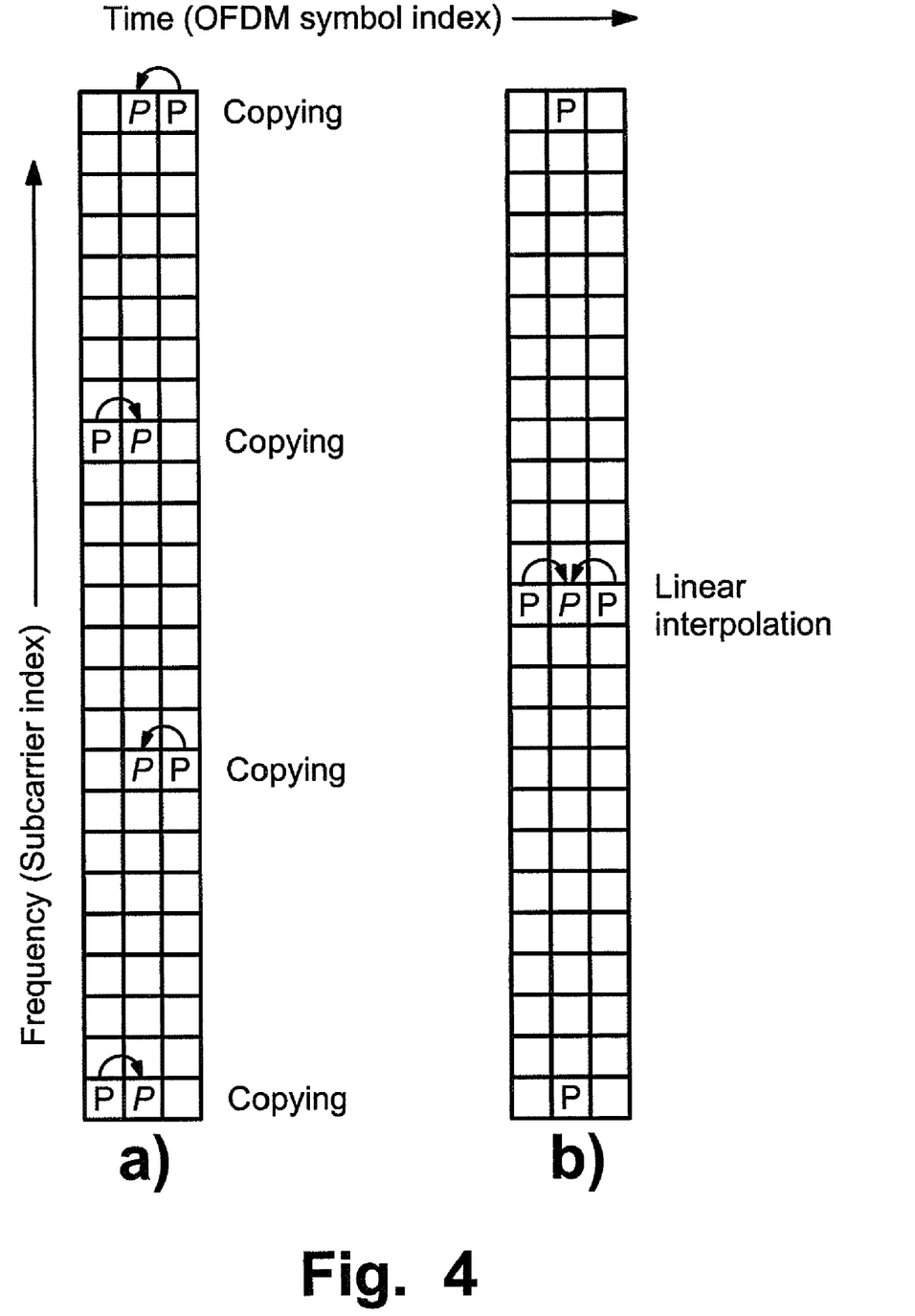

FIG. 4a) and 4b) illustrate the processing of the multi-carrier FDM signals in digital receiver 11 in more detail. FIG. 4a) shows a copying of pilot symbols of the first and third OFDM symbol into the second OFDM symbol. The result is a second OFDM symbol with a spacing of pilot symbols which is equidistant in frequency.

FIG. 4b) shows the creation of a new pilot symbol in the second OFDM symbol by means of interpolation. This interpolation is carried out on a sub-carrier basis, i.e. the two pilot symbols, which are used for the interpolation, belong to the same sub-carrier as the new pilot symbol.

Figure 5:
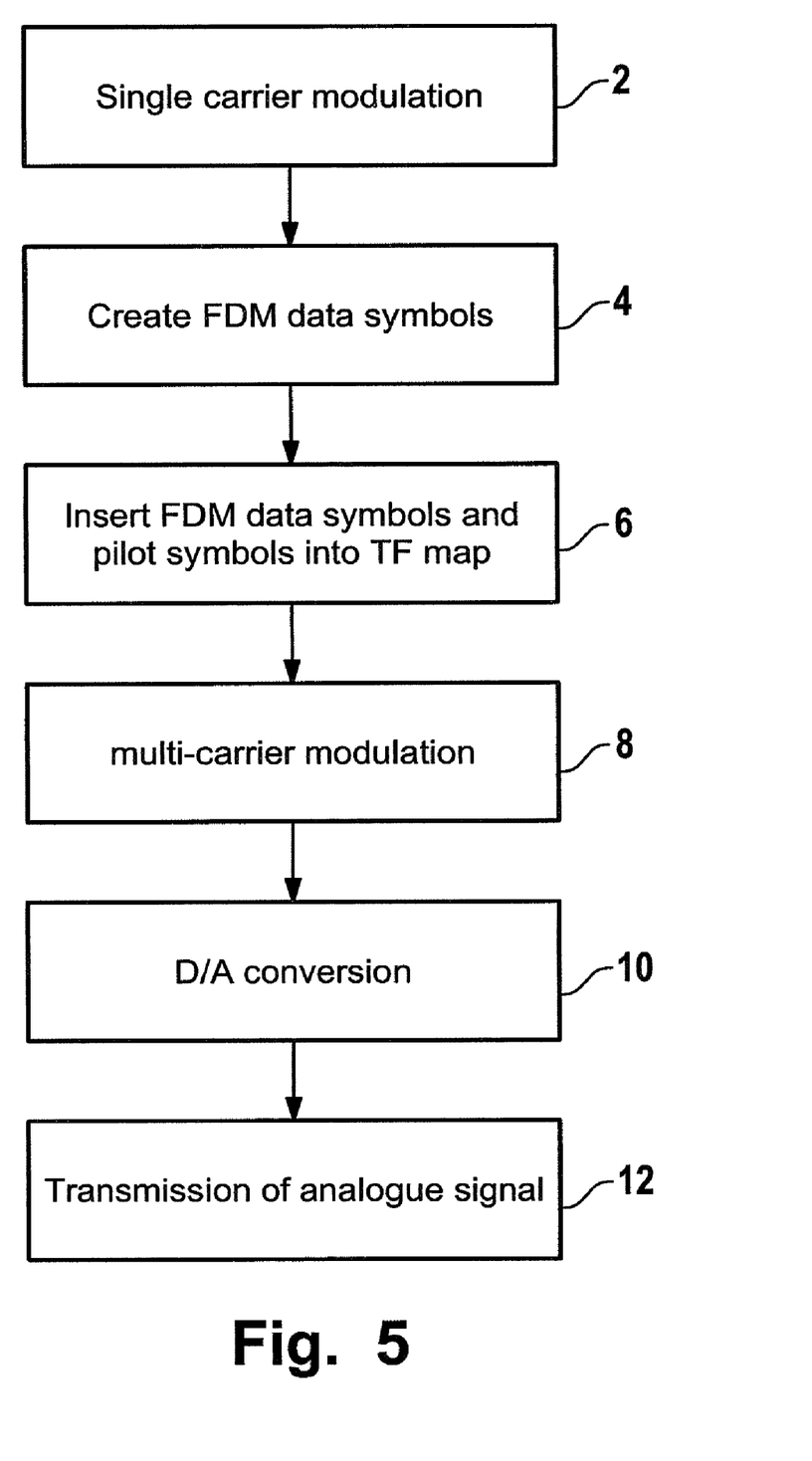
FIG. 5 is a flowchart illustrating the transmission of signals.

FIG. 5 shows a flowchart illustrating the transmission of signals according to embodiments described above. In step 2 a modulation, e.g. a QAM or QPSK modulation of the individual sub-carriers, of which a FDM signal, e.g. an OFDM signal is composed of, is carried out. In step 4 data symbols are generated. In step 6 the data symbols and pilot symbols are inserted into a TF map. The TF map may be a TF map according to FIG. 2b) to 2e), hence they show a non-equidistant spacing (in frequency) of pilot symbols within at least one FDM symbol. The result is a multitude of FDM symbols. In step 8 the FDM symbols are modulated. In step 10 the digital modulated multi-carrier signal is converted into an analogue signal by means of a (D/A) converter 10. In step 12 the analogue signal is transmitted over the air in the cellular telecommunication network.

Figure 6:
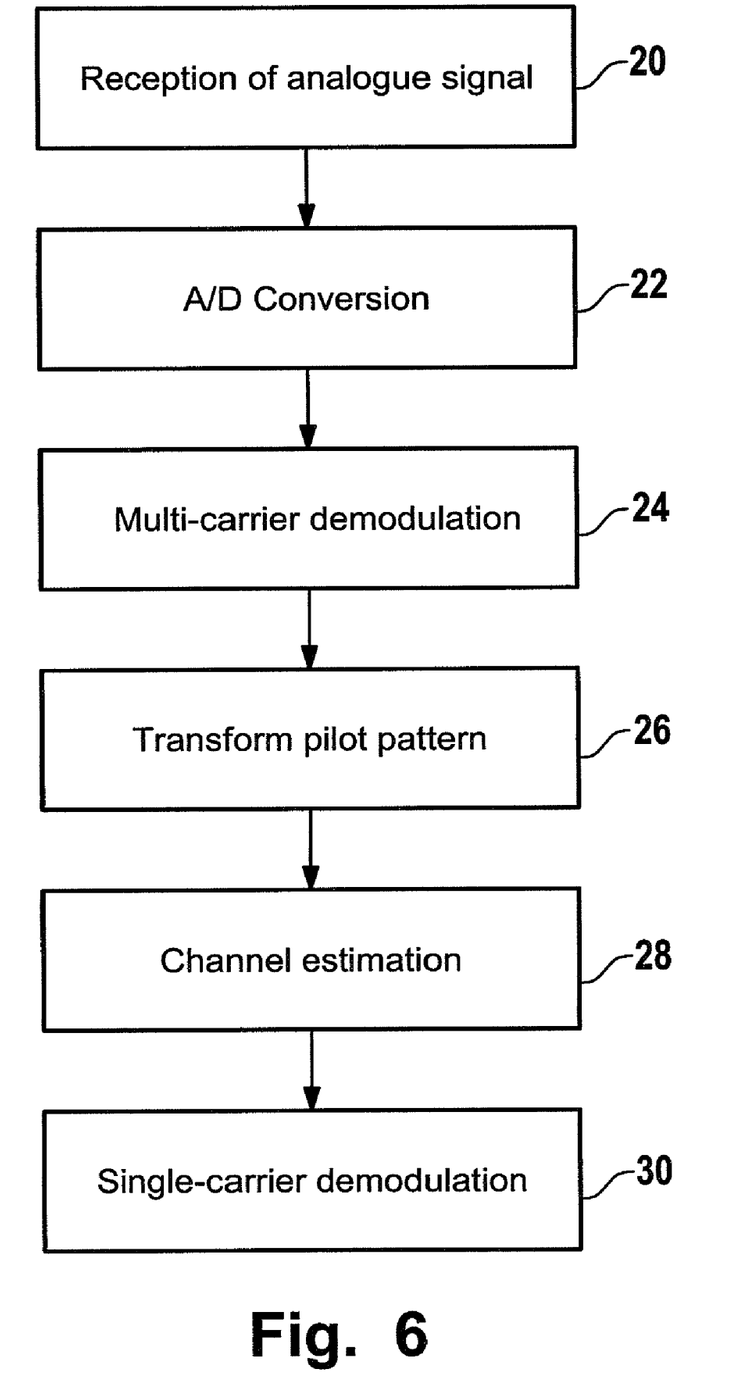
FIG. 6 is a flowchart illustrating the reception of signals.

The steps of the flowchart of FIG. 5 are carried out by a digital generator 7, e.g. the digital generator 7 of base station 1. A digital receiver 11 receives these signals and processes them. This is illustrated by the flowchart of FIG. 6.

In step 20 the analogue signal is received with an antenna 6. In step 22 the analogue signal is converted into a digital signal by means of an analogue-to-digital (A/D) converter 14. In step 24 the multi-carrier signal is demodulated, whereby the multi-carrier signal is based on a TF map having an a non-equidistant spacing (in frequency) of pilot symbols within a FDM symbol as in FIG. 2b) to 2e). In step 26 the pilot pattern is transformed into a second pilot pattern by means of the signal modification unit 13. In the second pilot pattern there is an equidistant spacing (in frequency) of pilot symbols within a FDM symbol as it is the case in FIG. 2a). In step 28 a FFT channel estimation is carried out. In step 30 the single carrier demodulation is carried out with the channel estimation obtained in step 28.

LIST OF REFERENCE NUMERALS 01 base station
02 antenna
03 cable
04 OFDM signal
05 terminal device
06 antenna
07 digital generator
08 electronic circuit
09 RAM
10 D/A converter
11 digital receiver
12 demodulator
13 signal modification unit
14 A/D converter
15 channel estimator
16 output port
17 output port
18 demodulation unit

The invention claimed is:

1. Digital receiver for multi-carrier FDM signals, comprising an electronic circuit being operated under the control of a computer program, further comprising:
    a) a demodulator for demodulating digital multi-carrier FDM signals, said signals being comprised of FDM symbols having pilot symbols, the pilot symbols of at least one FDM symbol being non-equidistantly spaced in frequency,
    b) a signal modification unit, said unit being configured to replace, on a sub-carrier basis, at least one data symbol with a pilot symbol, whereby the replacement yields a spacing of pilot symbols which is equidistant in frequency for all FDM symbols.

2. Digital receiver according to claim 1, wherein the FDM signals are OFDM signals.

3. Digital receiver according to claim 1, wherein the signal modification unit is adapted to replace a data symbol
    a) by copying a pilot symbol into the data symbol, or
    b) by interpolation.

4. Digital receiver according to claim 1, wherein the signal modification unit is adapted to provide pilot symbols on a DC sub-carrier by means of interpolation.

5. Digital receiver according to claim 1, further comprising a channel estimator and a demodulation unit for sub-carriers of the FDM signals.

6. Digital receiver according to claim 1, wherein the electronic circuit is a DSP or an FPGA.

7. Base station of a wireless cellular telecommunication system comprising a digital receiver according to claim 1.

8. Terminal device of a wireless cellular telecommunication system comprising a digital receiver according to claim 1.

9. A digital receiver for multi-carrier FDM signals, comprising an electronic circuit being operated under the control of a computer program, further comprising:
    a) a demodulator for demodulating digital multi-carrier FDM signals, said signals being comprised of FDM symbols having pilot symbols, the pilot symbols of at least one FDM symbol being non-equidistantly spaced in frequency; and
    b) a signal modification unit, said unit being configured to replace, on a sub-carrier basis, at least one data symbol of the demodulated digital multi-carrier FDM signals with a pilot symbol, wherein the replacement yields a spacing of pilot symbols which is equidistant in frequency for all FDM symbols.

* * * * *